J. FRIED.
IDENTIFICATION OF PLATES AND FILMS.
APPLICATION FILED MAY 1, 1920.
1,396,415.
Patented Nov. 8, 1921.
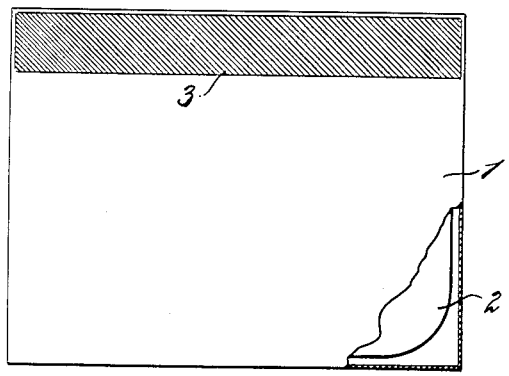
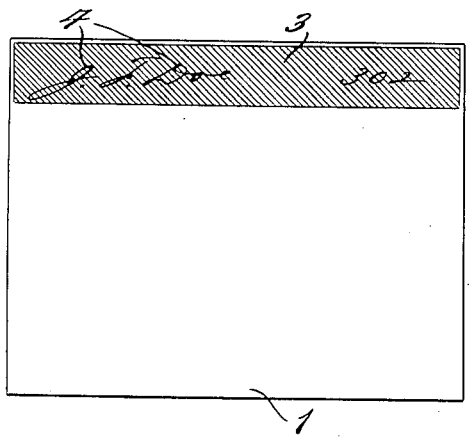
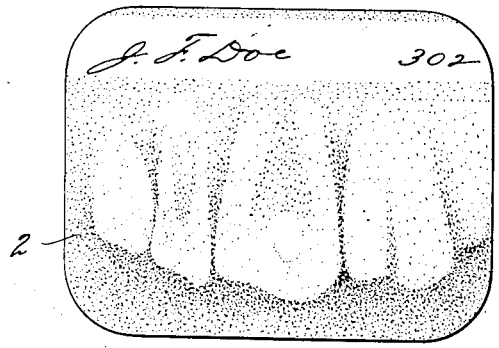
INVENTOR.
BY Julius Fried
Rosenbaum, Stockbridge & Rovet
ATTORNEYS.

UNITED STATES PATENT OFFICE.

JULIUS FRIED, OF NEW YORK, N. Y.

IDENTIFICATION OF PLATES AND FILMS.

1,396,415.  Specification of Letters Patent.  Patented Nov. 8, 1921.

Application filed May 1, 1920. Serial No. 378,155.

*To all whom it may concern:*

Be it known that I, JULIUS FRIED, a citizen of the United States, residing at New York, in the county of New York and State of New York, have invented certain new and useful Improvements in the Identification of Plates and Films, of which the following is a full, clear, and exact description.

This invention relates to the identification of photographic plates or films and particularly plates or films that are used in X-ray photography.

One object of my invention is to provide an improved method of marking photographic plates or films used in X-ray photography, which can be easily, quickly and inexpensively carried out and by means of which the plates or films can be permanently and distinctly marked with any desired identification, insignia or characters.

A further object is to provide an improved envelop or packet for photographic plates or films used in X-ray photography by means of which the plates or films can be permanently and clearly marked for identification.

Other objects and advantages will be apparent from the following description and the novel features of my invention will be particularly pointed out in claims.

In the drawings:

Figure 1 is a plan of a packet with an unexposed plate or film therein.

Fig. 2 is a plan of an envelop or packet containing unexposed plates or films and marked ready for exposure.

Fig. 3 is a plan of the plate or film after it has been exposed and developed.

In X-ray photography, the plates or films are commonly marketed in inclosures or wrappers of a material which cannot be penetrated by ordinary light rays but which permits the passage of X-rays, each wrapper containing one or more plates or films. These wrapped plates or films can be handled readily without danger thereto in ordinary daylight and exposure to the X-rays can also be carried on in the ordinary manner in ordinary day or artificial light. The wrapped plates or films are placed in the desired position with respect to the subject and the source of X-rays, and the exposure made in the usual manner, after which the plates are, while in a photographer's dark room, removed from their wrappers or packets and developed by usual methods. Where several plates or films are developed at a time, some means of identification is necessary, and by previously known methods of identification such as by tags, etc., the plates or films often become mixed or confused due to the accidental detachment of the tags in handling, etc. According to my invention, the identification is photographed upon the film or the plate simultaneously with the exposure to the X-rays. In the illustrated embodiment I provide the usual inclosure or wrapper 1 for one or more plates or films 2 as they are now commonly purchased. Along the edge or corner of the face which is to be directly exposed to the X-rays I provide a gelatinous coating 3 containing a substance substantially impenetrable by X-rays. When a photograph is to be taken, the desired identification symbol is first scratched into the coating, as indicated at 4 Fig. 2, by a suitable stylus, so that the coating will have a sufficient portion removed to permit passage of the X-rays along the scratched lines and the stoppage elsewhere under the coating will cause a photographic print of the scratching to be made upon the plate or film which will appear in the plate or film upon development. This identification can never be accidentally detached or lost, and provides a permanent identification at a practically negligible cost. Obviously the coating could be applied like ink in any desired outline either by the manufacturer or at the time of the exposure in which latter case the scratching could be dispensed with. I have found the application of a coating and the subsequent removal of a portion with a stylus to be the most feasible in practice.

As a coating material I have found bismuth subnitrate powder with a gelatinous binder to be very satisfactory, but obviously many other known substances having like properties may be used, if desired.

The embodiment herein described and illustrated is intended to be merely an example of the various forms or embodiments which my invention may take, since various changes therein may be made within the spirit and scope of my invention.

I claim:

1. The method of marking photographic plates or films for X-ray work, which comprises inclosing the plates or films with a material impenetrable by light and penetrable by X-rays, applying to one portion of the inclosure a coating of a material substantially impenetrable by X-rays, and then before exposure to X-rays removing portions of the coating to represent the identification symbols.

2. The method of marking photographic plates or films for X-ray work which comprises inclosing the plates or films with a material impenetrable by light and penetrable by X-rays, applying to a portion of the inclosure a material substantially impenetrable by X-rays and having any desired configuration, and positioning the inclosed plates or films with the last named material between the plates or films and the source of the X-rays.

3. A packet for plates or films used in X-ray work comprising an inclosure of a material impenetrable by light and penetrable by X-rays, and an adherent coating substantially impenetrable by X-rays upon a portion of that face of the inclosure to be exposed to the X-rays and removable in portions to represent any desired identification symbols.

4. A packet for plates or films used in X-ray work comprising an inclosure of a material impenetrable by light and penetrable by X-rays, and an adherent coating containing therein a substance substantially impenetrable by X-rays upon a portion of that face of the inclosure which is to be exposed to the X-rays and removable in portions to represent any desired identification symbols.

5. A packet for plates or films used in X-ray work comprising an inclosure of a material impenetrable by light and penetrable by X-rays, and an adherent coating containing bismuth subnitrate upon a portion of that face of the inclosure which is to be exposed to the X-rays.

6. A packet for plates or films used in X-ray work, comprising an inclosure of a material impenetrable by light and penetrable by X-rays, and having upon a portion of that face of the inclosure which is to be exposed to the X-rays an adherent substance substantially impenetrable by X-rays, and having any desired configuration.

In witness whereof, I hereunto subscribe my signature.

JULIUS FRIED.